United States Patent
Wilker et al.

[11] Patent Number: 5,696,410
[45] Date of Patent: Dec. 9, 1997

[54] OVERRIDE CIRCUIT FOR ENABLING INTERNAL COMBUSTION ENGINE

[75] Inventors: Robert J. Wilker, Macomb; Rick D. Caprathe, Redford, both of Mich.

[73] Assignee: Ford Motor Company, Dearborn, Mich.

[21] Appl. No.: 498,448

[22] Filed: Jul. 5, 1995

[51] Int. Cl.[6] .................................. B60R 25/04
[52] U.S. Cl. ........................... 307/10.5; 180/287
[58] Field of Search .................... 307/9.1, 10.1, 307/10.2–10.6; 180/287; 340/429.5, 426, 825.3–825.32, 825.34, 825.54, 825.44, 829.69, 825.72; 364/424.01, 424.05, 423.098, 423.099, 424.034, 424.037, 424.045; 123/198 B, 198 DC, 198 DB

[56] References Cited

U.S. PATENT DOCUMENTS

| | | | |
|---|---|---|---|
| 4,749,873 | 6/1988 | Mutch et al. | 307/9.1 |
| 4,990,906 | 2/1991 | Kell et al. | 340/825.31 |
| 5,091,856 | 2/1992 | Hasegawa et al. | 364/424.05 |
| 5,160,914 | 11/1992 | Sato | 340/426 |
| 5,394,327 | 2/1995 | Simon, Jr. et al. | 364/424.01 |
| 5,561,332 | 10/1996 | Udo et al. | 307/10.5 |

FOREIGN PATENT DOCUMENTS

| | | | |
|---|---|---|---|
| 61-29098 | 4/1995 | Japan | 307/10.5 |
| 61-34431 | 4/1995 | Japan | 307/10.5 |
| 6299026 | 7/1995 | Japan | 307/10.5 |

*Primary Examiner*—Richard T. Elms
*Attorney, Agent, or Firm*—Mark L. Mollon; Roger L. May

[57] ABSTRACT

An enabling device for a motor vehicle having an electronic ignition system including an engine control circuit for controlling the electronic ignition system of the motor vehicle, a hardware limited operating system for controlling the electronic ignition system, a latch electrically connected to the control circuit to enable the electronic ignition system, and an override circuit electrically connected to the latch and the hardware limited operating system to enable the hardware limited operating system.

8 Claims, 4 Drawing Sheets

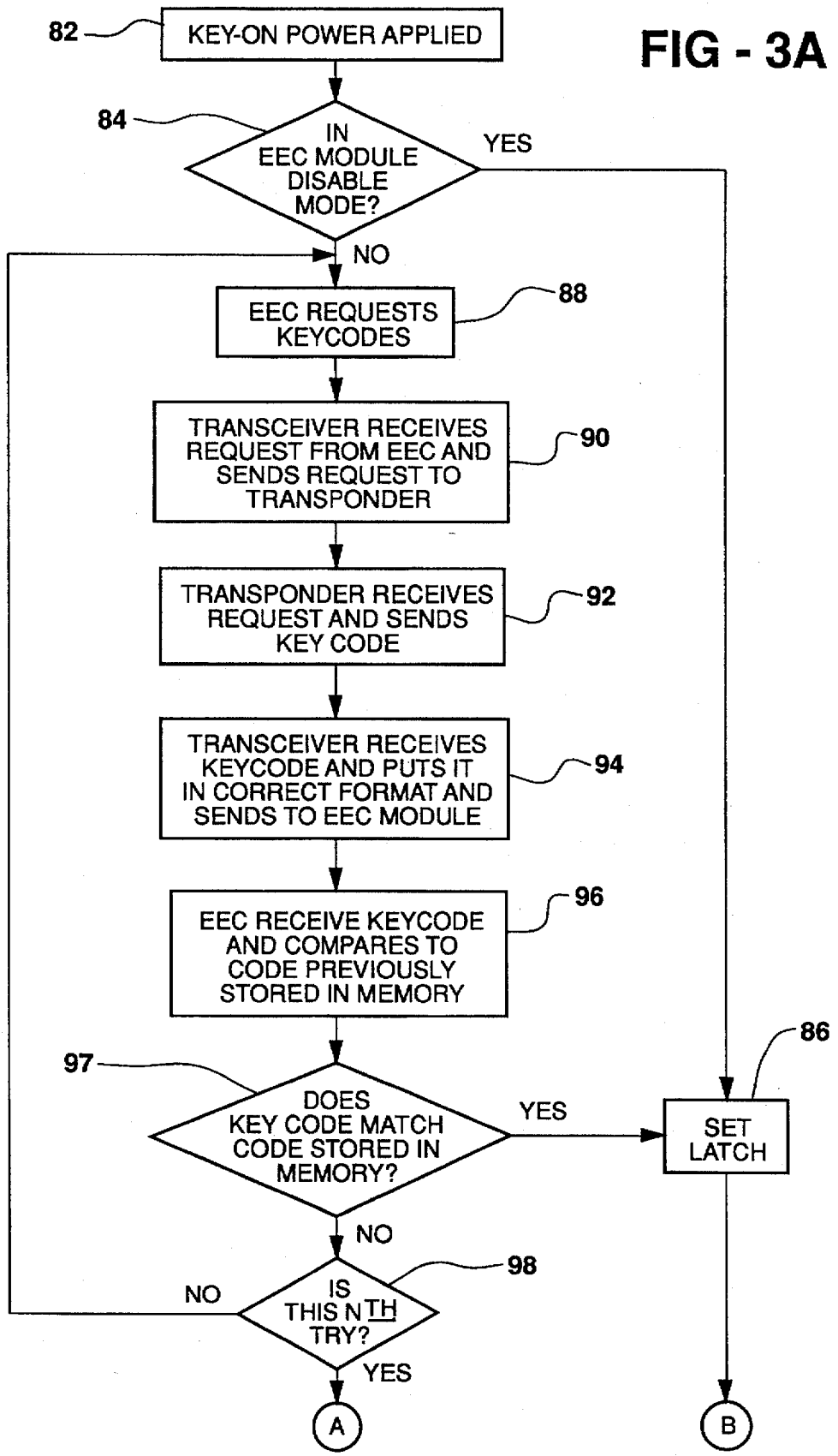

OVERRIDE CIRCUIT FOR ENABLING INTERNAL COMBUSTION ENGINE

BACKGROUND OF THE INVENTION

1. Field of the Invention

The present invention relates generally to an enabling device for a motor vehicle and, more specifically, to an enabling device for a motor vehicle that enables the operation of the internal combustion engine thereof.

2. Description of the Related Art

Motor vehicles are increasingly being controlled and operated by electronic componentry. In fact, the majority of the operations of the engine and the other electronic components of the motor vehicle, are ultimately controlled by a single microprocessor, commonly referred to as the electronic engine control (EEC) module. One concern with such a design is the dependency of engine control on the EEC module.

To insure the motor vehicle is operable even if there is a problem with the EEC module, a semi-redundant control system is installed in the motor vehicle. This system is a hardware limited operating system (HLOS). The HLOS operates in the event a problem with the EEC module arises. The HLOS performs any number of controls to prevent the occupant(s) of the motor vehicle from being stranded. Typically, the HLOS provides an indication to the operator of the motor vehicle that service is needed so the EEC module may be repaired or replaced.

Because the EEC module is so inclusive in its tasks, including anti-theft devices, the EEC module is a prime target for thieves to disable or destroy in order to easily steal the motor vehicle. More specifically, if a thief can disable the EEC module enough so that it determines itself inoperable, the control of the motor vehicle will be turned over to the HLOS. In the event the HLOS has a redundant anti-theft device, it can be easily disabled by hardwiring around the device. By rendering the EEC module and the anti-theft device of the HLOS, if any, inoperable, a thief has an operable motor vehicle with an inoperable anti-theft system. This allows the thief to drive the motor vehicle away without fear of sirens or disablement. The industry, to date, has not developed a vehicular control system which overcomes the problem of disabling the anti-theft system by disabling the EEC module in situations where the anti-theft system is a portion of the EEC microprocessor.

SUMMARY OF THE INVENTION

Accordingly, the present invention is an enabling device for a motor vehicle having an electronic ignition system. The enabling device includes a control unit for controlling the electronic ignition system of the motor vehicle. The enabling device also includes a hardware limited operating system for controlling the electronic ignition system wherein the hardware limited operating system is electrically connected to the control circuit. A latch is electrically connected to the control circuit and enables the electronic ignition system. The enabling device further includes and override circuit which is electrically connected to the latch to enable the hardware limited operating system.

An advantage associated with the present invention is both the combination of a passive anti-theft system into the EEC module and providing an enabling device which enables the motor vehicle to operate under normal conditions. By integrating the passive anti-theft system and the HLOS within the EEC module, destruction of the EEC module will not produce a driveable motor vehicle with a disabled passive anti-theft system. Another advantage associated with the present invention is that if a key code is not read within a predetermined time, the enabling device will not be activated and neither the engine control circuit nor the HLOS will allow the operation of the vehicles.

Other advantages and features of the present invention will be readily appreciated as the same becomes better understood by reference to the subsequent description when considered in connection with the accompanying drawings.

BRIEF DESCRIPTION OF THE DRAWINGS

FIGS. 3A and 3B are flowcharts of a method to operate the enabling device of FIGS. 1 and 2.

DESCRIPTION OF THE PREFERRED EMBODIMENT(S)

Figure 1:
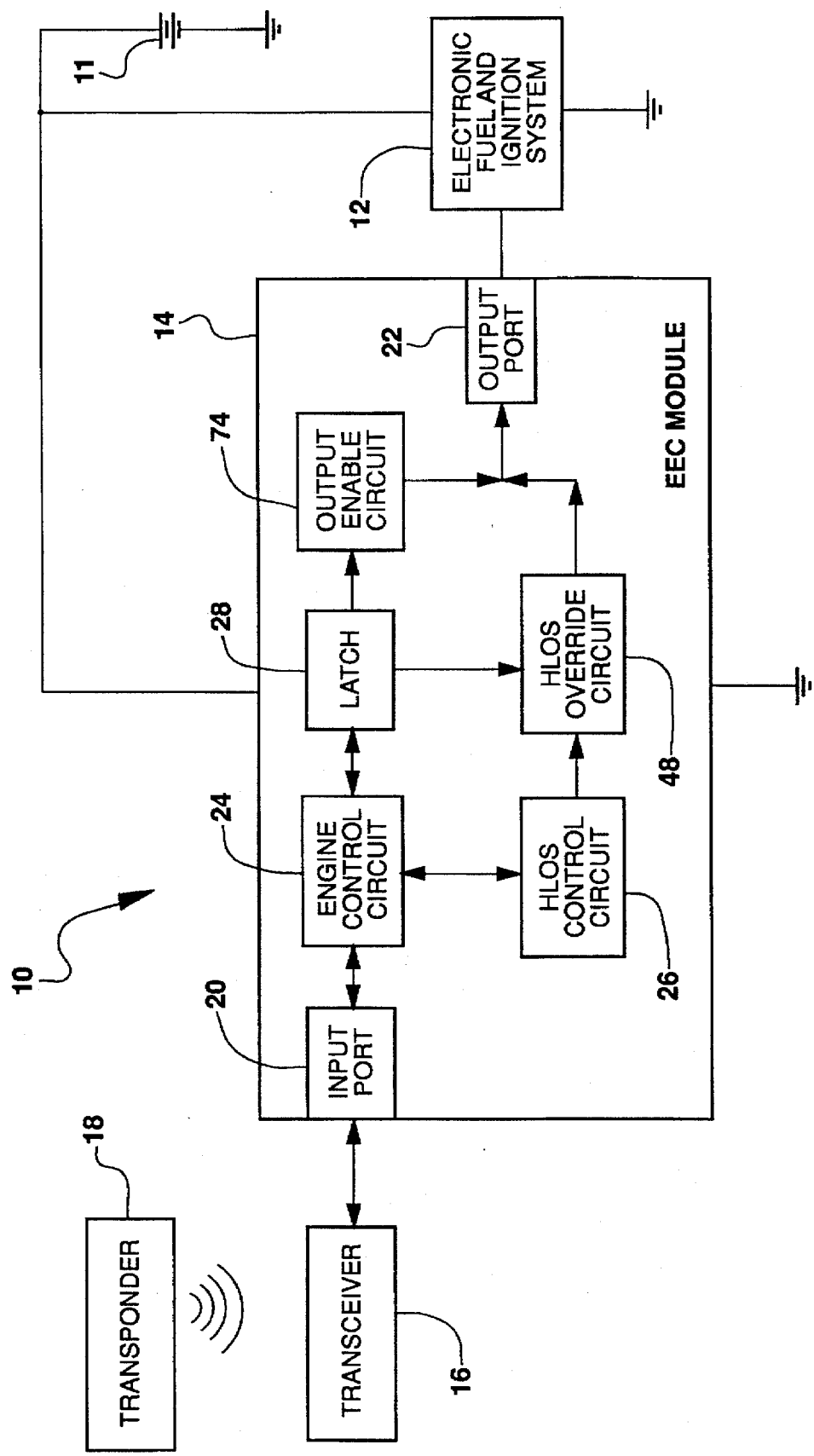
FIG. 1 is a block diagram of an enabling device according to the present invention.

Referring to FIG. 1, one embodiment of an enabling device, according to the present invention, is generally indicated at 10. The enabling device 10 is powered by a battery 11 and used with a motor vehicle having an electronic ignition system. For purposes of this disclosure, the electronic ignition system is shown and discussed as an electronic ignition and fuel injection system 12 and is defined as the electronic ignition and fuel injection system and any components relating to the fuel system and/or the ignition system, including the transfer of the fuel from the fuel system to the ignition system. Further, the electronic ignition and fuel injection system 12 may comprise only a portion or singular component of the above-mentioned systems. The enabling device 10 is housed in the electronic engine control (EEC) module 14. With the exception of the transceiver 16 and the transponder 18, the enabling device 10 is housed wholly between a bidirectional input port 20 and an output port 22 of the EEC module 14. It should be appreciated by those skilled in the art that the EEC module 14 may include a plurality of input ports (unidirectional or bidirectional) and output ports. Only one input port 20 and output port 22 are shown in FIG. 1 to reduce details shown therein. The transceiver 16 and transponder 18 will be discussed subsequently.

An engine control circuit 24 is located in the EEC module 14. The engine control circuit 24 controls the electronic ignition and fuel injection system 12 of the motor vehicle (not shown). It should be appreciated by those skilled in the art that the control circuit 24 controls a plurality of systems. Again, these systems are not shown as a matter of convenience. In one embodiment, the control circuit 24 is a portion of a microprocessor.

A hardware limited operating system (HLOS) control circuit 26 controls the electronic ignition and fuel injection system 12 through HLOS (not shown) when at least a portion of the engine control circuit 24 is disabled. The HLOS control circuit 26 is a circuit which is at least partially redundant to the engine control circuit 24. The HLOS control circuit 26 operates when the engine control circuit 24 is partially or wholly disabled. The HLOS control circuit 26 allows the limited operation of the motor vehicle should the engine control circuit 24 be disabled to prevent the stranding of the occupants of the motor vehicle. The HLOS control circuit 26 is electrically connected between the bidirectional input port 20 and the output port 22. The HLOS control circuit 26 is electrically connected directly to the engine control circuit A latch 28 is electrically connected to the engine control circuit 24. The latch 28 is operatively connected between the engine control circuit 24 and the output port 22. The latch 28 does not enable the electronic ignition system 12 when the engine control circuit 24 receives a code differing from a predetermined code transmitted by the transponder 18.

Figure 2:
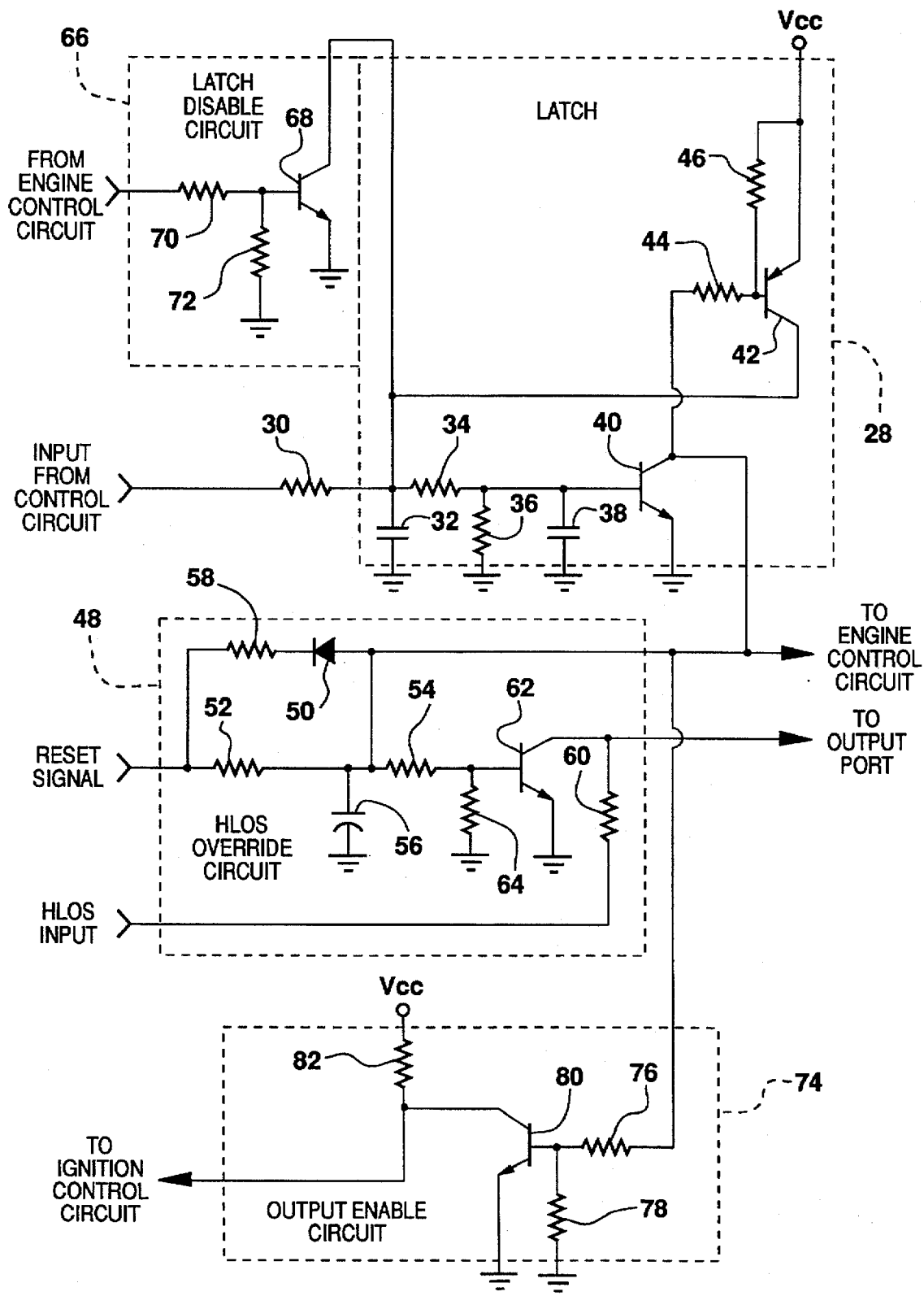
FIG. 2 is an electrical schematic of a portion of the enabling device of FIG. 1.

Referring to FIG. 2, one embodiment of the latch 28 is schematically represented. The latch 28 receives a signal, either high or low, from the engine control circuit 24. A high signal represents that the code received from the transponder 18 matches a code stored in memory (not shown) of the engine control circuit 24 or the EEC module 14. A low signal represents one of two possibilities. The first possibility is that a code was not received from the transponder 18. The second possibility is that an incorrect code was received by the transponder 18. The latch 28 receives the input, either high or low, through a first resistor 30. The signal is then filtered through a number of resistors and capacitors. In one embodiment, a first capacitor 32 and a second resistor 34 are connected to the first resistor 30. The first capacitor 32 is also connected to ground. A third resistor 36 and second capacitor 38 are connected in parallel between the second resistor 34 and ground. The second resistor 34, third resistor 36, and second capacitor 38 are all connected to the base of a first transistor 40. The first transistor 40 and a second transistor 42 perform the latching function. The collector of the first transistor 40 is connected to the base of the second transistor 42 through a fourth resistor 44. A fifth resistor 46 is connected between the emitter and the base of the second transistor 42. The collector of the second transistor 42 is operatively connected to the base of the first transistor 40 through the second resistor 34. The emitter of the second transistor 42 is also connected to a voltage source $V_{cc}$. Further, the emitter of the first transistor 40 is connected to ground. The collector of the first transistor 40 is an output to be received by the engine control circuit 24.

As illustrated in FIG. 1, the enabling device 10 further includes an HLOS override circuit 48 connected to the HLOS control circuit 26 and the latch 28. The HLOS override circuit 48 is operatively connected between the HLOS control circuit 26 and the output port 22. The HLOS override circuit 48 enables the HLOS control circuit 26 and the HLOS when the engine control circuit 24 receives a code transmitted by the transponder 18 which matches the code stored in the memory of the engine control circuit 24. More specifically, the HLOS override circuit 48 prevents the operation of the HLOS control circuit 26 after a predetermined time, 500 ms in one embodiment, when an incorrect code is received by the transceiver 16. Additionally, the HLOS override code 48 prevents the operation of the HLOS control circuit 26 when no code is received by the transceiver 16. The HLOS override circuit 48 receives a signal from the latch 28 and, more particularly, the collector of the first transistor 40, whereby the HLOS override circuit 48 will not override the HLOS 26 if the latch 28 is not set.

Referring again to FIG. 2 one embodiment of the HLOS override circuit 48 is schematically shown. The HLOS override circuit 48 includes three (3) inputs. As discussed above, the first input is from the collector of the first transistor 40. This input is connected to a diode 50, a sixth resistor 52, a seventh resistor 54, and a third capacitor 56. The second input is connected to the sixth resistor 52 and an eighth resistor 58. The second input is a reset signal received from a power supply (not shown). The third input is from the HLOS control circuit 26 and is connected to a ninth resistor 60.

In this embodiment, the reset signal is received from the power supply,. The reset signal is time delayed thus allowing the electronic ignition and fuel injection system 12 to operate without a proper code being read. This insures that starting is not delayed while the transponder 18 is transmitting the code to the transceiver 16 and processed by the engine control circuit 24. The reset signal from the power supply is low for approximately 120 ms. Once the reset signal goes high, the third capacitor 56 charges. The third capacitor 56 will fully charge in approximately 300 ms, after which time a third transistor 62 will be turned on. More specifically, the input which receives the rest signal form the power supply is operatively connected to the base of the third transistor 62. The emitter of the third transistor 62 is connected to ground. The second input is connected to the sixth resistor 52. The sixth resistor 52 is also connected to the seventh resistor 54, the diode 50 and the third capacitor 56. The third capacitor 56 is also connected to ground. The seventh resistor 54 is connected to the base of the third transistor 62 and a tenth resistor 64. The tenth resistor 64 is also connected to ground. The sixth resistor 52, seventh resistor 54, third capacitor 56, and tenth resistor 64 are used to filter the signal received from the power supply prior to the transmission to the base of the third transistor 62. Once the third transistor 62 is turned on, the output of the HLOS override circuit 48 is low which disables the HLOS control circuit 26. The third input of the HLOS override circuit 48 is tied to the output of the HLOS override circuit 48 through the ninth resistor 60. The third input will be maintained low regardless of the HLOS input when the third transistor 62 is low. The emitter of the third transistor 62 is connected to ground.

When the reset signal from the power supply is high, the third capacitor 56 is charged. Once the third capacitor 56 is charged, approximately 300 ms, the third transistor 62 is turned on. The diode 50 and the eighth resistor 58 quickly discharge the third capacitor 56 when the reset signal from the power supply returns to a low state, typically when the ignition key is turned off. The quick discharge of the third capacitor 56 allows the operator of the motor vehicle to quickly reattempt to start the motor vehicle if the operator was unsuccessful in starting the motor vehicle. If the latch 28 is set, the third transistor 62 will not turn on, regardless of the state of the reset signal from the power supply. Therefore, by the latch 28 not receiving a correct code from the transponder 18, the latch 28 is set and the HLOS overrides circuit 48 disables the HLOS control circuit 26.

A latch disable circuit 66, shown in FIG. 2, disables the latch 28 when the engine control circuit 24 is in a reset mode. The latch disable circuit 66 prevents the latch 28 from setting until the engine control circuit 24 comes out of the reset mode. The latch disable circuit 66 includes a fourth transistor 68 wherein the collector of the fourth transistor 68 is operatively connected to the base of the first transistor 40 through the second resistor 34. The collector of the fourth transistor 68 is also connected to the collector of the second transistor 42. The emitter of the fourth transistor 68 is connected to ground. An eleventh resistor 70 is connected between the base of the fourth transistor 68 and the engine control circuit 24. A twelfth resistor 72 is connected between the eleventh resistor 70, the base of the fourth transistor 68, and ground.

An output enable circuit 74 is electrically connected to the latch 28 to disconnect the electronic ignition and fuel injection system 12 of the motor vehicle by not enabling the operation of the output port 22. The output enable circuit 74 includes an input which is electrically connected to the collector of the first transistor 40. A thirteenth resistor 76 is connected to the input which is electrically connected to the collector of the first transistor 40. A thirteenth resistor 76 is connected to the input of the output enable circuit 74. A fourteenth resistor 78 is also connected to the thirteenth resistor 76 and ground. Both the thirteenth resistor 76 and the fourteenth resistor 78 are connected to the base of the fifth transistor 80. The collector of the fifth transistor 80 is connected to the output of the output enable circuit 74 and a fifteenth resistor 82. The fifteenth resistor 82 is also connected to the voltage source $V_{cc}$. The fifth transistor 80 will be off when the latch 28 is set. The fifth transistor 80 controls the reset for a separate ignition control circuit, a microprocessor in one embodiment. When the fourth transistor 62 is off, the voltage supply $V_{cc}$ maintains the output of the output enable circuit 74 high through the fifteenth resistor 82. If the output to the output enable circuit 74 is low, the separate ignition control circuit will be reset and, hence, disabled. The output enable circuit 74 may be used for other outputs such as fuel injectors, fuel pump, fuel injection, which were previously set forth as being a part of or all of the electronic ignition and fuel injection system 12.

Figure 3B:
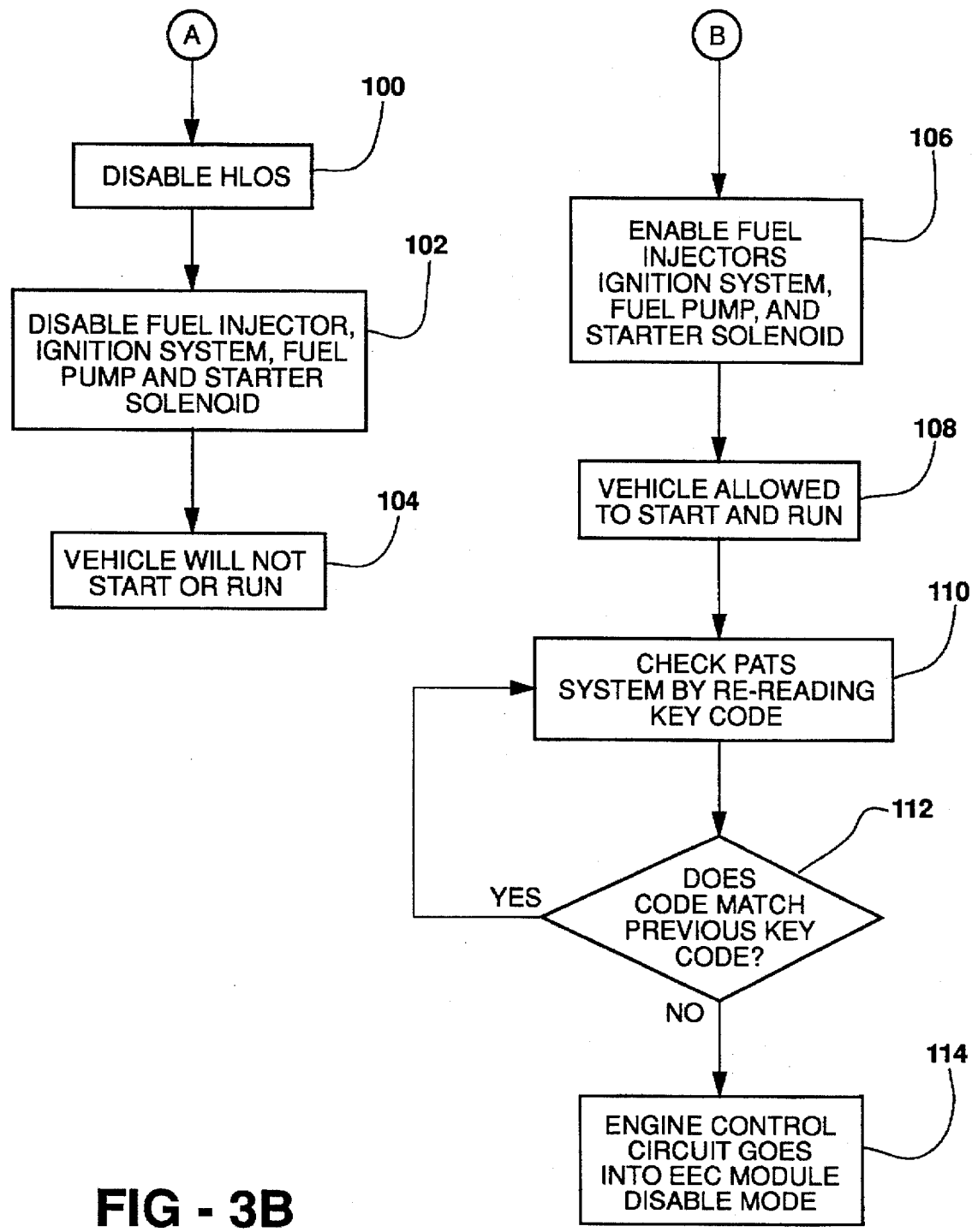

Referring to FIGS. 3A and 3B, the ignition key, which houses the transponder 18, is inserted into the ignition key hole and turned to the start position at 82. The engine control circuit 24 determines if a problem exists with the EEC module 14 at 84, i.e., if the engine control circuit 24 is operating in an EEC module disabled mode. If so, the latch 28 is set at 86. If not, however, the engine control circuit 24 requests the predetermined code or key code at 88. The transceiver 16 sends a power signal to the transponder 18 to charge a capacitor (not shown) thereof at 90. Once the capacitor is charged, the transponder 18 uses the charge to send the predetermined code to the transceiver, 16 at 92. The transceiver 16 receives the predetermined code and sends it to the EEC module 14 at 94. The engine control circuit 24 compares the predetermined code to that stored in memory at 96. If a match is made at 97, the latch 28 is set at 86. If not, a counter, at 98, determines if this attempt was the $n^{th}$ attempt, a predetermined number of attempts such as ten (10). If not, the EEC module 14 or, more particularly, the engine control circuit 24 requests the transponder 18 to send the predetermined code another time at 88. If, however, the attempt was the $n^{th}$ attempt, tenth, the HLOS is disabled at 100. Likewise, all the electronic ignition and fuel injection system 12 (including the start solenoid) are disabled at 102 preventing the operation of the motor vehicle at 104.

Returning to diamond 97, if the predetermined code matches the code stored in the memory, an EEPROM in one embodiment, the latch is set at block 86. The electronic ignition and fuel injection system 12 is enabled at 106 and the motor vehicle is allowed to start in run at 108. The engine control circuit 24 continues to compare the predetermined code to the code stored in memory at 110. If, at diamond 112, the codes match, the codes are compared again at block 110. This loop continues until the ignition key is turned to the off position. If the codes do not match at this point, the engine control circuit 24 enters the EEC module disabled mode, at 114. An indicator, such as a light emitting diode in one embodiment, will alert the occupants of the motor vehicle that the motor vehicle is not operating without the use of the enabling device. When the enabling device 10 is not operating, the motor vehicle will be turned on and operated without a proper key code.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An enabling device for a motor vehicle having an electronic ignition system comprising:

an engine control circuit operatively connected between an input port and an output port for controlling the electronic ignition system of the motor vehicle;

a transceiver operatively connected to said engine control circuit for transmitting a power signal generated by said engine control circuit and for receiving a predetermined code, said transceiver transmitting the predetermined code to said engine control circuit;

a hardware limited operating system control circuit for controlling the electronic ignition system, said hardware limited operation system control circuit electrically connected to said engine control circuit;

a latch electrically connected to said engine control circuit to disable the electronic ignition system; and an override circuit electrically connected to said latch to enable said hardware limited operating system control circuit to enable the electronic ignition system when said engine control circuit is inoperable.

2. An enabling device as set forth in claim 1 including a latch disable circuit for disabling said latch when said engine control circuit is in a reset mode.

3. An enabling device as set forth in claim 2 including a transceiver for transmitting a power signal generated by said engine control circuit and for receiving a predetermined code.

4. An enabling device as set forth in claim 3 including a transponder for receiving the power signal from said transceiver and for emitting the predetermined code to be received by said engine control circuit through said tranceiver.

5. An enabling device as set forth in claim 4 including an output enabling circuit electrically connected to said latch and said output port to operate said output port such that the electronic ignition system of the motor vehicle is operable.

6. An enabling device for a motor vehicle having an electronic ignition system comprising:

an electronic engine control module having an input port and output port;

an engine control circuit operatively connected between said input port and said output port for controlling the electronic ignition system of the motor vehicle;

a transceiver operatively connected to said engine control circuit for transmitting a power signal generated by said engine control circuit and for receiving a predetermined code, said transceiver transmitting the predetermined code to said engine control circuit;

a transponder for sending a predetermined code to said engine control circuit, the predetermined code receivable by said transceiver;

a hardware limited operating system control circuit for controlling the electronic ignition system when at least a portion of said engine control circuit is disabled, said hardware limited operation system control circuit electrically connected between said input port and said output port;

a latch operatively connected to said engine control circuit between said engine control circuit and said output port, said latch emitting a high signal when said engine control circuit receives the predetermined code transmitted by said transponder;

an output enable circuit electrically connected between said latch and said output port, said output enable circuit enabling said output port when said latch sends the high signal thereto indicating the receipt of the predetermined code; and an override circuit connected to said hardware limited operating System control circuit and said latch between said hardware limited operating System control circuit and said output port to enable said hardware limited operating system control circuit when said engine control circuit receives the predetermined code transmitted by said transponder and when said engine control circuit is inoperable to enable the electronic ignition system.

7. An enabling device as set forth in claim 6 including a latch disable circuit for disabling said latch when said engine control circuit is in a reset mode.

8. An enabling device as set forth in claim 6 wherein said engine control circuit includes a receiver for receiving the predetermined code from said transponder.

\* \* \* \* \*